United States Patent [19]
Rich

[11] 3,910,420
[45] Oct. 7, 1975

[54] ARTICLE TRANSFER AND SUPPORT APPARATUS

[76] Inventor: Edward L. Rich, 3980 Peppermill Lane, Bay City, Mich. 48706

[22] Filed: June 25, 1973

[21] Appl. No.: 372,918

[52] U.S. Cl. .................. 214/1 BB; 72/425; 214/1 F
[51] Int. Cl.² .......................................... B65G 35/00
[58] Field of Search ............ 72/420, 307, 425, 426, 72/250, 252; 214/1 F, 1 R, 1 P, 1.1, 1.3, 1.4, 26, 1 BB, 1 BT; 104/134

[56] References Cited
UNITED STATES PATENTS

| | | | |
|---|---|---|---|
| 474,951 | 5/1892 | Dunne | 104/134 |
| 2,933,203 | 4/1960 | Duffy | 214/1 F |
| 3,126,770 | 3/1964 | Wuppermann et al. | 214/27 X |
| 3,199,686 | 8/1965 | Wasserman | 214/1.3 |
| 3,590,616 | 7/1971 | Schussler | 72/425 X |
| 3,618,788 | 11/1971 | Murray | 214/1.6 |
| 3,791,307 | 2/1974 | Applegate | 104/34 |

FOREIGN PATENTS OR APPLICATIONS 1,220,942   1/1971   United Kingdom................. 214/670

Primary Examiner—Frank E. Werner
Attorney, Agent, or Firm—Learman & McCulloch

[57] ABSTRACT

Article transfer and support apparatus comprises a carriage provided with article support means and mounted on a base for movement from a position in which a workpiece may be mounted on and removed from the carriage to a second position in which the article is engageable by a tool or the like. Driving means is provided for moving the carriage to and from its respective positions and speed control means acts on the carriage for retarding the acceleration of the carriage as it moves from either position to the other and for decelerating the carriage as it approaches either of the first or second positions. The carriage is mounted on the base by resilient bearing means which may be deformed upon engagement of the workpiece by the tool to avoid stressing of the bearings.

12 Claims, 6 Drawing Figures

ARTICLE TRANSFER AND SUPPORT APPARATUS

The invention disclosed herein relates to article transfer and support apparatus of the kind comprising a workpiece carriage which is movable from a first position in which the workpiece is clear of an operating tool to a second position in which the workpiece is engageable by the tool, the movement of the carriage being controlled in such a manner that it accelerates relatively slowly in moving from its first position and decelerates as it approaches its second position.

The safety regulations applicable to machinery of the kind in which a workpiece must be introduced to and removed from a position between relatively movable parts require that the workpiece be supported in a loading and unloading position in which no harm can come to the machine operator in the event of inadvertent operation of the relatively movable parts of the machine. In stamping machinery of the kind wherein a movable platen supports a tool for movement toward and away from a base or anvil, the workpiece support conventionally comprises a reciprocable carriage which is movable between a workpiece loading and unloading station that is somewhat remote from the path of movement of the tool. Various kinds of mechanisms have been proposed for driving the carriage from and to its loading and unloading station and it is desirable that the movement of the carriage be as rapid as possible so as to enable the machinery to be as productive as possible. In many instances, the acceleration of the carriage from its loading or unloading station is so rapid that the workpiece is moved relatively to the carriage. Moreover, in many instances the stopping of the carriage at the working station is so abrupt that the workpiece moves relatively to the carriage. In either event, relative movement between the workpiece and the carriage necessitates delays or possible damage to the workpiece, the machinery, or both.

An object of this invention is to provide workpiece support apparatus movable from a loading station to a working station, and vice-versa, and wherein the movement of the support apparatus is controlled in such manner as to avoid inadvertent displacement of a workpiece carried by the support.

Another object of the invention is to provide apparatus of the kind described wherein the control over the movements of the workpiece support apparatus is obtained automatically without necessitating conscious action by the workman.

A further object of the invention is to provide mounting means for a workpiece support of the character referred to and wherein the mounting means is resilient so as to minimize wear of the mounting means during operation of the apparatus.

Other objects and advantages of the invention will be pointed out specifically or will become apparent from the following description when it is considered in conjunction with the appended claims and the accompanying drawings, in which:

Figure 1:
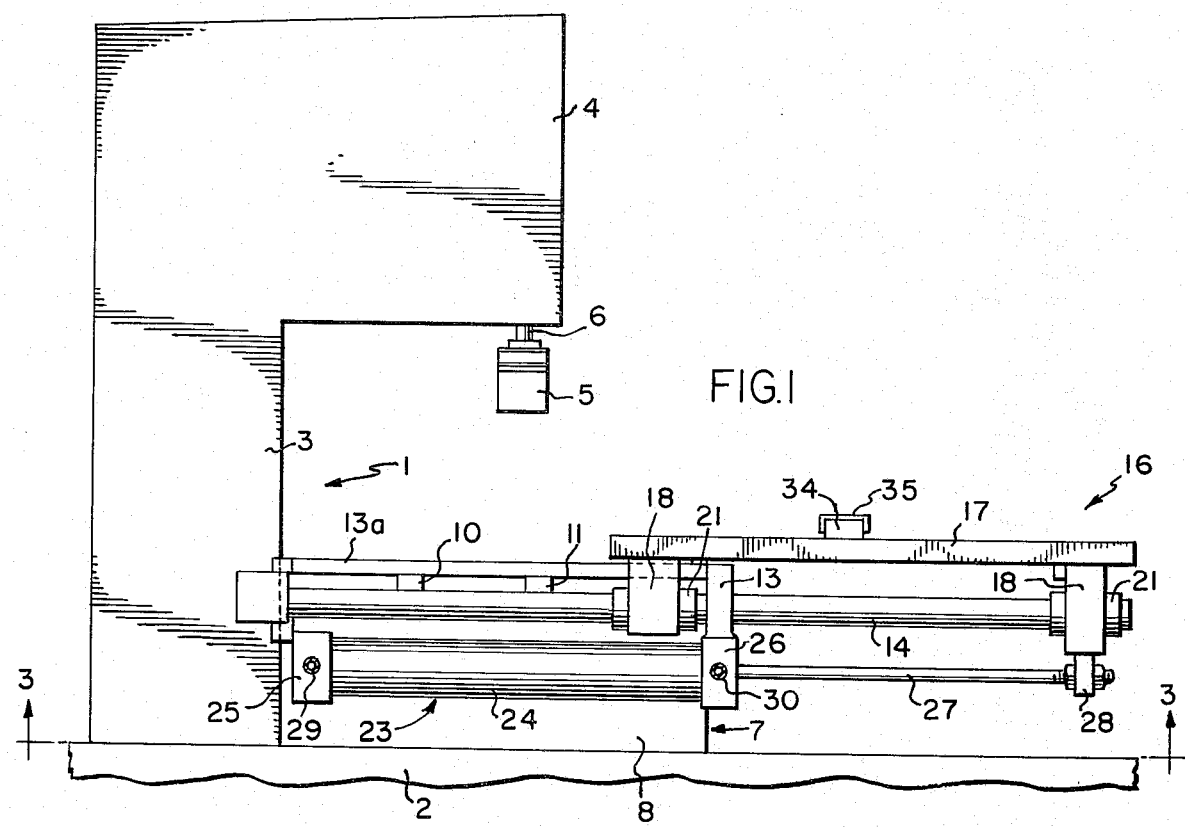
FIG. 1 is a fragmentary, side elevational view of apparatus constructed in accordance with the invention and illustrating a workpiece supporting carriage in its loading and unloading station.
Figure 2:
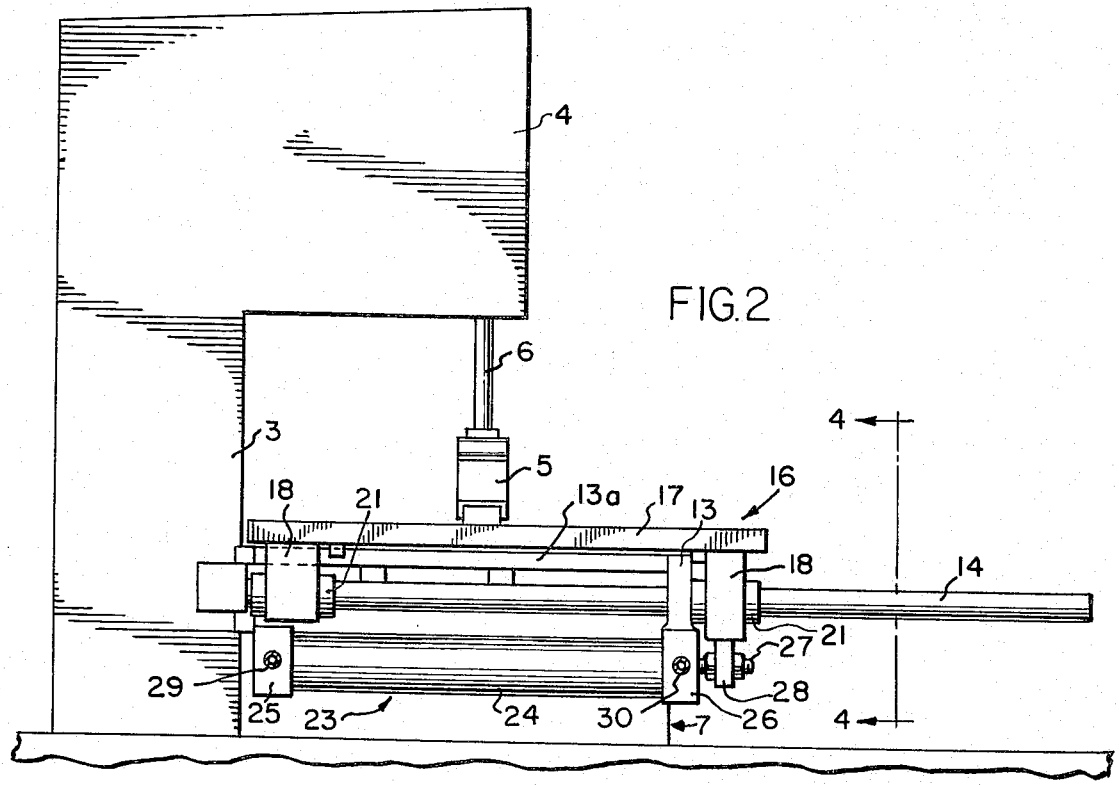
FIG. 2 is a view similar to FIG. 1, but illustrating the workpiece supporting carriage in its working station.
Figure 3:
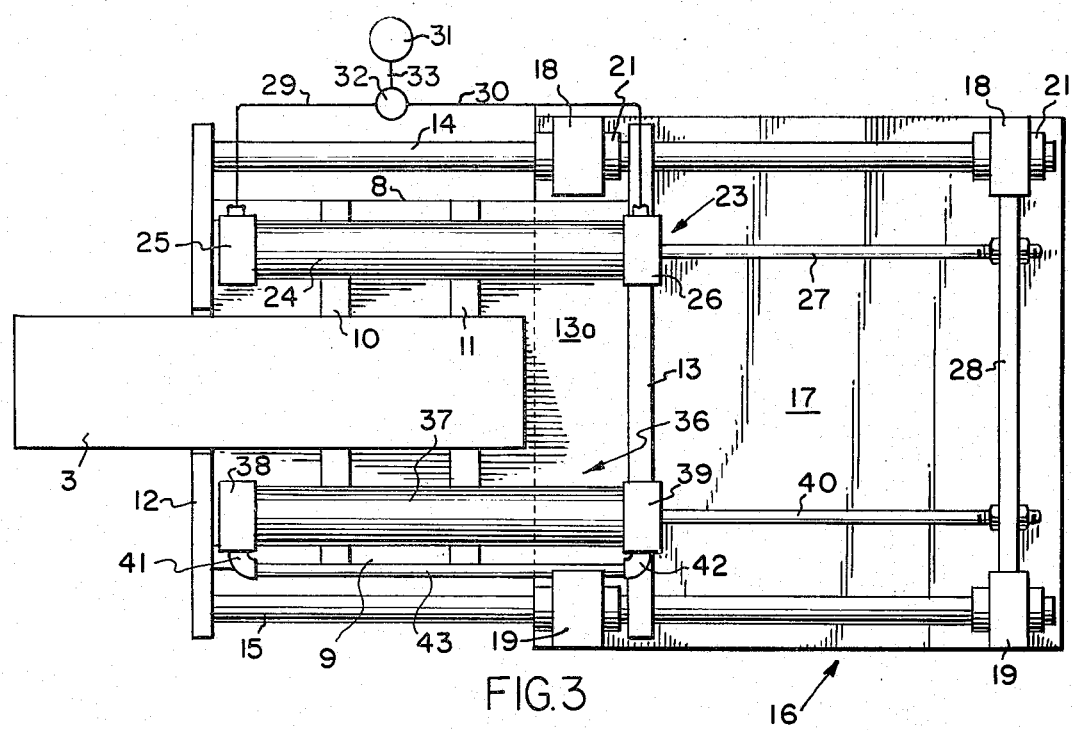
FIG. 3 is a bottom plan view of the apparatus as viewed in the direction of the arrows 3—3 of FIG. 1 with the carriage driving means illustrated schematically.
Figure 4:
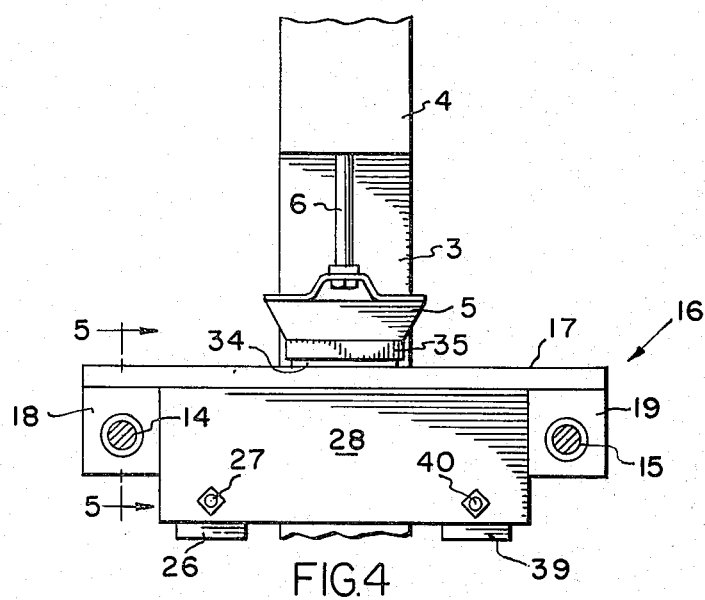
FIG. 4 is a sectional view taken on the line 4—4 of FIG. 2.

Apparatus constructed in accordance with the invention is adapted for use in conjunction with a stamping machine 1 comprising a base 2 on which is mounted an upstanding support 3 provided at its upper end with a head 4 that overhangs the base 2. Carried by the head 4 is a stamping tool 5 which is fixed to the lower end of a vertically reciprocable rod 6 which may be reciprocated between the raised and lowered positions as shown in FIGS. 1 and 2, respectively, by any suitable means such as a pressure fluid ram (not shown) or the like.

Supported on the base 2 is a frame 7 having parallel side members 8 and 9 joined by cross members 10 and 11 and by end members 12 and 13. Carried by the cross members is a horizontal plate 13a that is fixed to the side members 8 and 9, the plate constituting a rigid part of the frame 7.

Fixed in the end members 12 and 13 of the frame 7 is a pair of parallel, spaced apart guide rods 14 and 15 which extend a substantial distance beyond the end member 13. Mounted on the guide rods in a manner hereinafter to be described is a reciprocable carriage 16 comprising a horizontal plate 17 having secured to its lower surface pairs of blocks 18 and 19 having bores through which the guide rods 14 and 15 extend. Fitted into the bore of each of the blocks 18 and 19 is a bearing assembly 20 comprising a sleeve 21 within which is a plurality of circulating ball bearings (not shown). Surrounding the sleeve 21 is a resilient, compressible ring 22 composed of a rubbery material such as neoprene and which is force-fitted in the bore of its associated block. The bearing assemblies 20 may be of the kind manufactured by Thompson Industries, Inc., Manhasset, N.Y.

The plate 17 of the carriage 16 overlies the plate 13a of the frame 7 so as to permit the carriage 16 to be movable fore and aft of the frame 7. Means 23 is provided for effecting such movements of the carriage 16 and comprises a double acting fluid cylinder 24 having a collar 25 at one end secured to the lower surface of the plate 13a and a similar collar 26 at its opposite end secured to the end member 13. A piston (not shown) is reciprocable in the cylinder 24 and is connected to a piston rod 27 which is secured to a cross member 28 carried by the plate 17 of the carriage 16. The length of the stroke of the piston is limited by its engagement with the opposite ends of the cylinder 24, as is conventional.

To one end of the cylinder 24 is connected a fluid line 29 and a similar fluid line 30 is connected to the other end of the cylinder 24. The lines 29 and 30 communicate with a source 31 of pressure fluid, such as compressed air, via a multiple position valve 32 and a conduit 33. The construction and arrangement of the ram 23 are such that positioning of the valve 32 in a manner to enable pressure fluid to be introduced to the cylinder 24 via the line 29 drives the carriage 16 toward the position shown in FIG. 1, the fluid in advance of the piston being exhausted to atmosphere through the line 30 and the valve 32. When the valve 32 is positioned to introduce fluid to the cylinder 24 via the line 30, the carriage is driven toward the position shown in FIG. 2 and fluid in advance of the piston is exhausted to atmosphere via the line 29 and the valve 32.

The plate 17 of the carriage 16 is provided with a workpiece support 34 on which a workpiece 35 may be mounted. The location of the support 34 is such that, when the carriage 16 is in the loading station shown in FIG. 1, the workpiece is clear of the path of movement of the tool 5. When the carriage is moved to the working position shown in FIG. 2, however, the workpiece 35 will lie in the path of downward movement of the tool 5 so as to be engaged thereby.

In a conventional construction the movement of the carriage 16 between the positions shown in FIGS. 1 and 2 by the ram 23 normally is quite rapid. In some instances, the acceleration of the carriage from either of its positions toward the other is so rapid as to cause the workpiece 35 to be displaced from support 34. Moreover, the deceleration of the carriage 16 as it reaches either of the extreme limits of its movement may be so sudden as to jar the workpiece 35 off its support 34. To overcome these tendencies, apparatus constructed in accordance with the invention is provided with speed control means 36 for retarding the acceleration of the carriage and for retarding its deceleration regardless of the direction of movement of the carriage. The speed control means comprises a fluid ram similar to the ram 23 and having a cylinder 37 provided with collars 38 and 39 at its opposite ends by means of which the cylinder is fixed to the members 13a and 13, respectively. The cylinder 37 contains a piston (not shown) that is connected by a piston rod 40 to the cross member 28 of the carriage 16. The opposite ends of the cylinder 37 are provided with fittings 41 and 42 having passages communicating with the interior of the cylinder and joined by a fluid conduit 43 by means of which fluid may be transferred from one side of the piston to the other as the piston moves relatively to the cylinder 37. Preferably, the cylinder 37 contains air, rather than a liquid, for the reason that air is somewhat elastic in the sense that it may be compressed and expanded, both of which characteristics are employed in controlling the speed of the carriage 16.

When the apparatus described thus far is conditioned for operation, the carriage 16 will be in the position shown in FIG. 1, hereinafter referred to as the loading position, in which a workpiece 35 may be fitted to the support 34 without the necessity of the workman's hands being placed in the path of travel of the tool 5. When the workpiece is in place, the valve 32 may be adjusted so as to cause fluid to be introduced to the cylinder 24 via the line 30, thereby exerting a force via the piston rod 27 on the carriage 16 urging it to move toward the operative position shown in FIG. 2. As the carriage begins to move toward its operative position, air in the cylinder 37 in advance of the associated piston will be compressed and exhausted through the passage in the fitting 41 to the line 43 for delivery into the cylinder 37 via the passage in the fitting 42. As the piston of the cylinder 37 begins its movement, the air behind the piston is expanded, due to the suction effect of the piston's movement, thereby retarding the acceleration of the carriage 16 until such time as air exhausted through the passage in the fitting 41 enters the cylinder 37 via the passage in the fitting 42. The introduction of air behind the moving piston in the cylinder 37 eliminates the suction effect, thereby enabling the piston to move faster and, consequently, accelerates the movement of the carriage 16.

As the carriage 16 approaches the working position shown in FIG. 2, air in advance of the piston in the cylinder 37 is compressed due to the accelerated speed of the piston and the constant diminishing of the volume between the moving piston and the end of the cylinder. The compressed air thus provides a cushioning and retarding force on the piston with consequent deceleration of the carriage 16. The deceleration of the carriage as it approaches its working station is such as to enable the carriage to come to rest without dislodging the workpiece 35 from its support 34.

When the carriage is driven by the driving ram 23 from its working position to its loading station, the speed control apparatus 36 will function in the same manner as it does when the carriage is driven to its working position. That is, the carriage accelerates relatively slowly as it moves from its working position and decelerates as it approaches its loading station.

The acceleration and deceleration retarding effects exerted by the speed control means 36 on the carriage 16 depend upon the diameter of the passages in the fittings 41 and 42 and upon the internal diameter of the conduit 43. These dimensions, in turn, will depend upon the mass of the carriage 16 and the forces generated by the driving ram 23. The dimensions of the passages in the fittings 41 and 42 and in the conduit 43 also will depend to some extent upon the mass of the workpiece 35 and the manner in which it is supported on the carriage. For any given set of the foregoing factors, therefore, the dimensions of the passages may be determined empirically so as to enable the carriage 16 to move from either of its two positions to the other in the shortest possible time without dislodging the workpiece as the carriage moves from and to either of its two extreme positions.

Figures 5, 6:
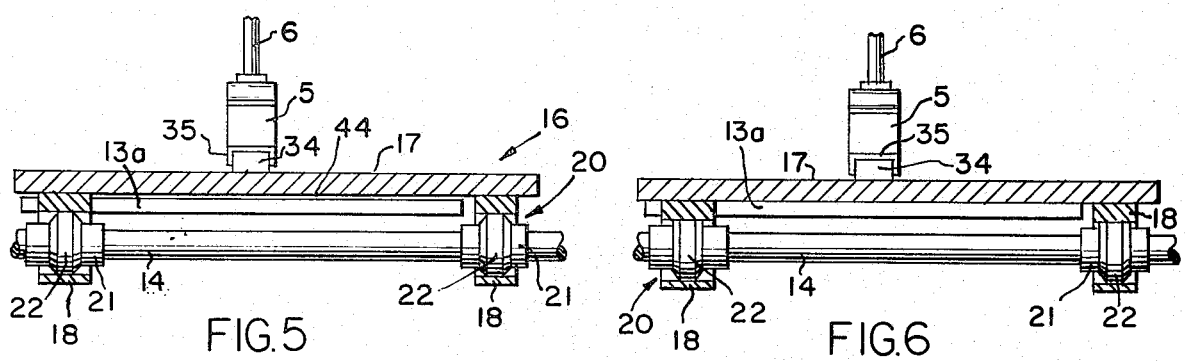
FIG. 5 is a sectional view taken on the line 5—5 of FIG. 4 and illustrating the position of the workpiece carriage just prior to engagement of the workpiece by a tool.
FIG. 6 is a view similar to FIG. 5, but illustrating the position of the workpiece carriage during the engagement of the workpiece by a tool.

As is best shown in FIG. 5, the bearing assemblies 20 normally support the carriage plate 17 at such a level above the frame plate 13a as to provide a space or clearance 44 between the two plates. The clearance enables the carriage 16 to move relatively to the frame 7 without the adverse effect of friction which would be induced if the plates 13a and 17 were constantly in engagement, and makes it unnecessary to provide a lubricant between the two plates. When the tool 5 engages the workpiece 35, however, the rubbery rings 22 of the bearing assemblies 20 are deformed, as is shown in FIG. 6, thereby enabling the plate 17 to move vertically toward and bear forcibly against the plate 13a. The plate 13a limits the vertical movement of the plate 17 and provides a solid support for the carriage 16 to enable the workpiece 35 to be stamped by the tool 5. When the tool 5 is returned to its raised position following a stamping operation, the resiliency of the rubbery rings 22 enables them to recover and restore the carriage 16 to its elevated position.

The deformability of the rubbery rings 22 also absorbs the shocks which otherwise would be imparted to the bearings of the assemblies 20 by the stamping engagement of the tool 5 with the workpiece 35. As a consequence, neither the bearings themselves nor the guide rods 14 and 15 are flattened or scored by stamping operations.

The disclosed embodiment is representative of a presently preferred form of the invention, but is intended to be illustrative rather than definitive thereof. The invention is defined in the claims.

What is claimed is:

1. Article transfer and support apparatus comprising a base member; a carrier member for supporting an article; means mounting said carrier member on said base member for movements along a path between first and second positions; means for moving said carrier member from one of said positions to the other; and speed control means acting on said carrier member for retarding acceleration of said carrier member away from said one of said positions and for decelerating said carrier member as it approaches said other position, said speed control means comprising fluid cylinder means fixed to one of said members, piston means reciprocable within said cylinder means and connected to the other of said members, and fluid passage means establishing communication between opposite ends of said cylinder means.

2. Apparatus according to claim 1 wherein said speed control means is pneumatic.

3. Apparatus according to claim 1 wherein said fluid passage means is external of said cylinder means.

4. Apparatus according to claim 1 wherein said mounting means mounts said carrier member for movement transversely of said path.

5. Apparatus according to claim 4 wherein said mounting means includes resiliently compressible means interposed between said carrier member and said base member.

6. Apparatus according to claim 4 wherein said mounting means includes bearings in engagement with said base member and resiliently compressible means interposed between said bearings and said carrier member.

7. Apparatus according to claim 4 including means cooperable between said base member and said carrier member for limiting movement of the latter in one direction transversely of said path.

8. Article support and transfer apparatus comprising base means; carriage means for supporting an article; bearing means mounting said carriage means on said base means for movement of said carriage means relatively to said base means along a path; and resiliently compressible means interposed between said bearing means and said carrier means for enabling movement of the latter transversely of said path, said bearing means comprising a housing and wherein said resiliently compressible means comprises a rubbery member carried by said housing.

9. Apparatus according to claim 8 wherein said rubbery member comprises an annulus.

10. Apparatus according to claim 8 including limit means operable to limit movement of said carriage means in one direction transversely of said path.

11. Apparatus according to claim 8 wherein said base means and said carriage means include confronting members normally spaced apart from one another, said resiliently compressible means being sufficiently compressible to enable said confronting members to engage one another in response to movement of said carriage means transversely of said path.

12. Apparatus according to claim 11 wherein the resilience of said resiliently compressible means is sufficient to move said carriage means transversely of said path and effect disengagement of said confronting members.

* * * * *